United States Patent [19]

Nakajima

[11] 4,246,528
[45] Jan. 20, 1981

[54] SYSTEM FOR CONTROLLING ALTERNATING CURRENT MOTORS

[75] Inventor: Kihei Nakajima, Yokohama, Japan

[73] Assignee: Tokyo Shibaura Denki Kabushiki Kaisha, Japan

[21] Appl. No.: 14,098

[22] Filed: Feb. 22, 1979

[30] Foreign Application Priority Data

Feb. 27, 1978 [JP] Japan .................................. 53/20848

[51] Int. Cl.³ ............................................ H02P 5/28
[52] U.S. Cl. .................................... 318/721; 318/722; 318/723
[58] Field of Search ............... 318/720, 721, 722, 723, 318/798, 799, 800, 801, 802, 803

[56] References Cited

U.S. PATENT DOCUMENTS

| 3,780,361 | 12/1973 | Poppinger et al. | 318/721 |
| 4,112,339 | 9/1978 | Lipo | 318/722 X |
| 4,137,489 | 1/1979 | Lipo | 318/722 X |

FOREIGN PATENT DOCUMENTS

| 2459965 | 7/1975 | Fed. Rep. of Germany | 318/799 |
| 2711497 | 12/1977 | Fed. Rep. of Germany | 318/721 |
| 5181914 | 7/1976 | Japan . | |
| 5193316 | 8/1976 | Japan . | |

Primary Examiner—J. V. Truhe
Assistant Examiner—Richard M. Moose
Attorney, Agent, or Firm—Stevens, Davis, Miller & Mosher

[57] ABSTRACT

In a control system of an AC motor fed from a frequency converter including a thyristor rectifier and a thyristor inverter, the speed of the motor is controlled by a current control system comprising a speed control circuit responsive to a reference speed signal and an actual speed signal, and a current control circuit which produces a pulse signal supplied to the rectifier. The inverter is controlled by another pulse signal corresponding to the angular position of the rotor of the motor. An additional current instruction circuit is provided which in response to the two pulse signals described above controls the current control circuit.

2 Claims, 8 Drawing Figures

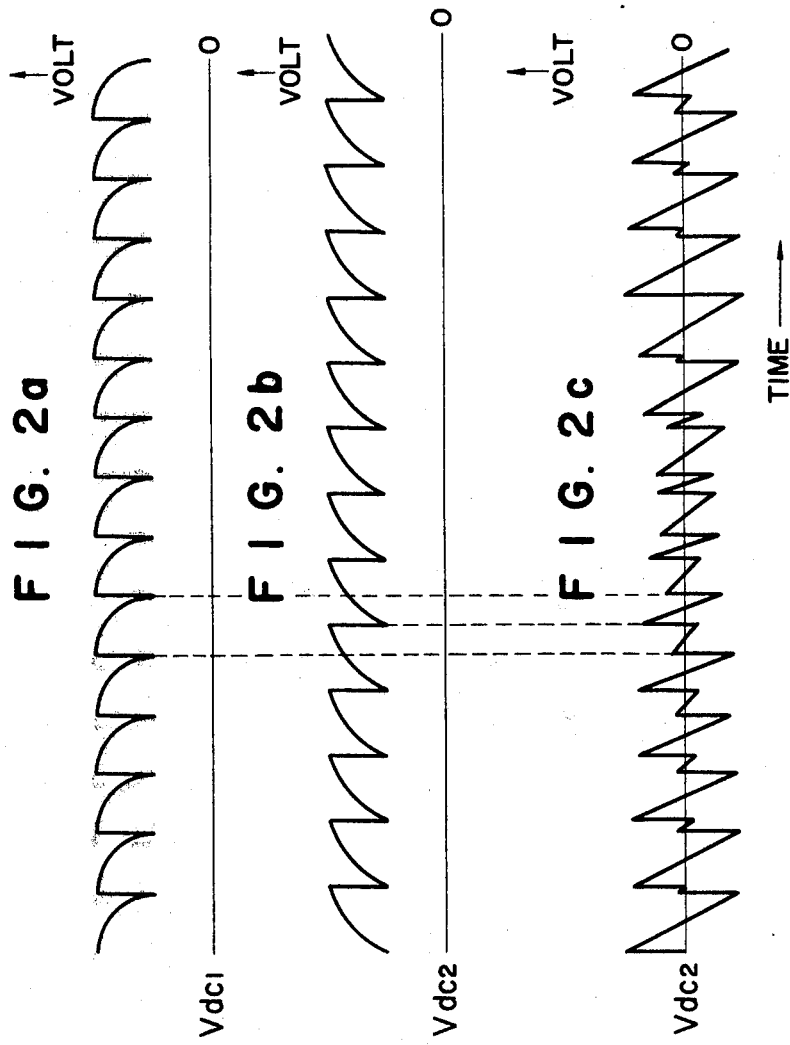

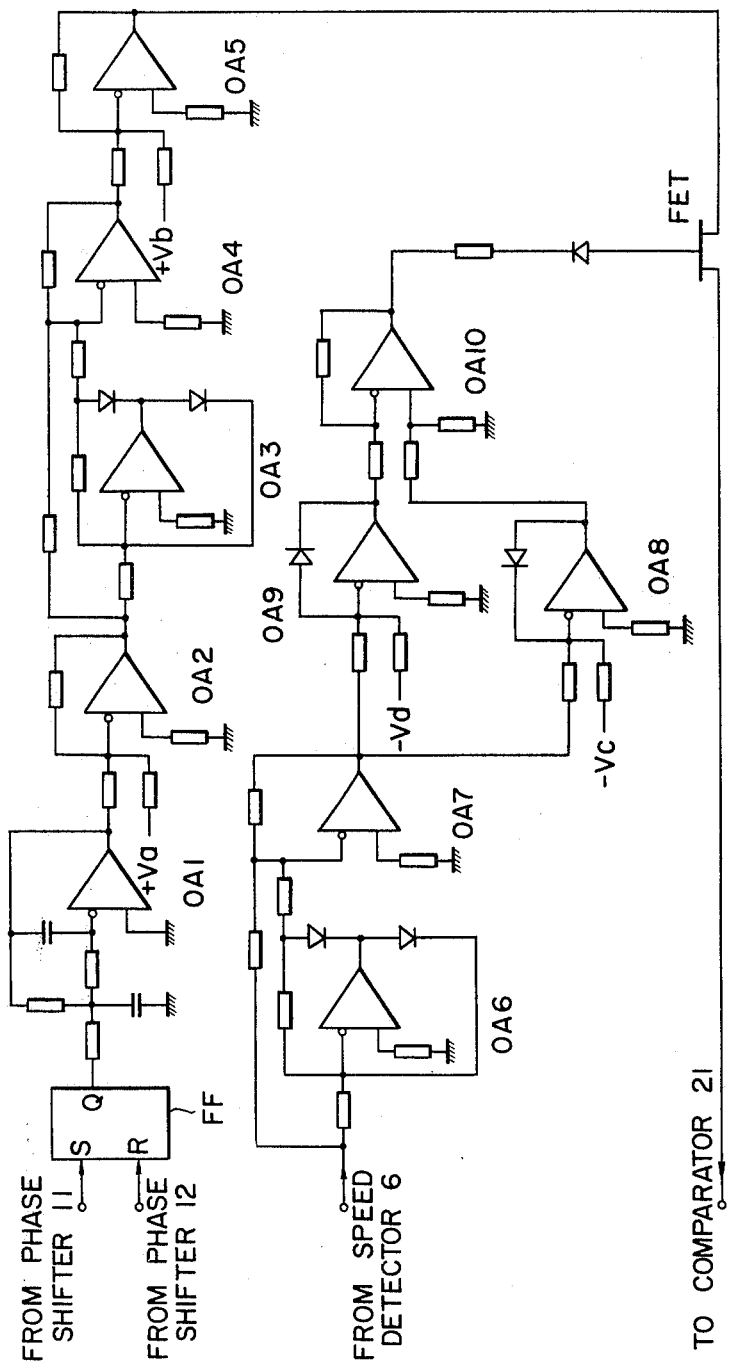

SYSTEM FOR CONTROLLING ALTERNATING CURRENT MOTORS

BACKGROUND OF THE INVENTION

This invention relates to a system for controlling the speed of an alternating current motor, more particularly, a system for controlling an AC motor capable of preventing current beats when the load frequency of the inverter approaches the frequency of an AC power source.

As will be described later in more detail, the conventional commutatorless AC motor is fed from a polyphase AC source of commercial frequency through a thyristor rectifier and a thyristor inverter which comprises a frequency converter. In the operation of such frequency converter, due to overlap angle and phase lag of ignition pulses supplied to respective thyristors, it is inevitable that the DC component contains a certain amount of AC components superposed thereon. Where the load frequency is close to the source frequency the ripple frequencies of the rectifier and inverter are close enough and the difference of these two frequencies is small. This causes a beat phenomenon of ripple voltage. Considering a current control system of such frequency converter, such phenomenon can be considered as a type of an external disturbance and causes a current beat and speed variation of the motor. Although various solutions have been proposed they are not efficient from the standpoint of performance and economy.

SUMMARY OF THE INVENTION

Accordingly, it is an object of this invention to provide a novel system for controlling an AC motor fed from a frequency converter capable of efficiently preventing the current beat where the load frequency is in a range close to the source frequency.

According to this invention there is provided a system of controlling an alternating current motor fed from a source of alternating current via a rectifier and an inverter, each comprising semiconductor switching elements, wherein the speed of the motor is controlled by a control current produced by a current control system including a speed control circuit responsive to a reference speed signal and an actual speed signal of the motor, and a current control circuit responsive to the output of the speed control circuit for producing a first pulse signal applied to the semiconductor switching elements of the rectifier and wherein, the semiconductor elements of the inverter is controlled by a second pulse corresponding to an angular position of the rotor of the motor, characterized in that there are provided an additional current instruction circuit responsive to the first and second pulse signals and a signal representing the actual speed, and means for applying the output of the additional current instruction circuit to the current control circuit.

BRIEF DESCRIPTION OF THE DRAWINGS

In the accompanying drawings:

FIG. 2a–2c show DC voltage waveforms of the converter shown in FIG. 1;

FIG. 5 is a connection diagram showing the detail of an addition current instruction circuit.

DESCRIPTION OF THE PREFERRED EMBODIMENT

To have better understanding of the invention, one example of a prior art commutatorless motor will firstly be described.

Figure 1:
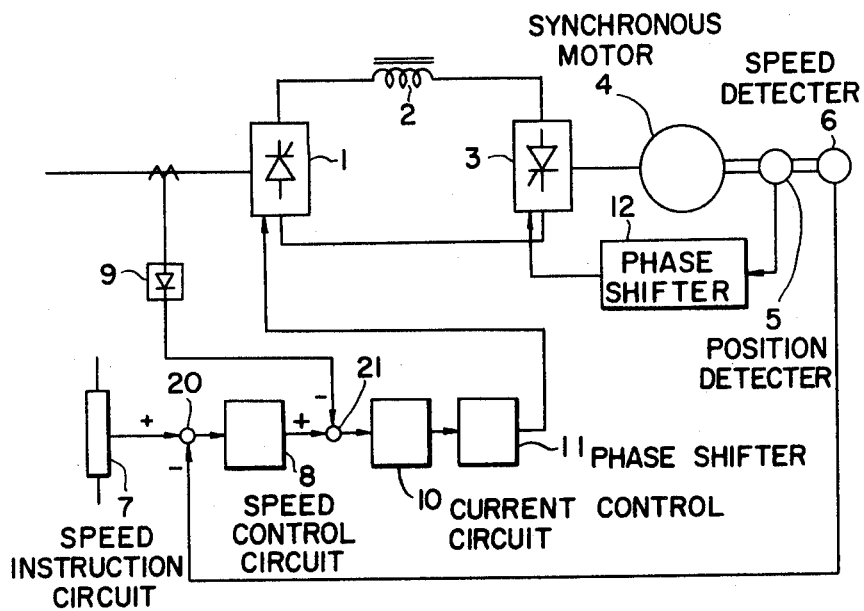
FIG. 1 is a connection diagram showing a prior art commutatorless motor.

The commutatorless motor shown in FIG. 1 comprises a thyristor rectifier 1 which converts three phase alternating current into direct current, a DC reactor 2 for smoothing the direct current, a thyristor inverter 3 for converting the direct current into three phase alternating current having a desired frequency, a synchronous motor 4 energized by the three phase alternating current, a position detector 5 for detecting the angular position of the rotor of the synchronous motor 4, and a speed detector 6 for detecting the speed thereof.

The control system of the motor comprises a speed instruction circuit 7 for producing a reference speed signal which is compared with a speed signal generated by the speed detector 6 by a comparator 20. The output of the comparator 20 is applied to a speed control circuit 8 to obtain a current instruction signal which is compared by a comparator 21 with the output of a current detector 9 which produces a signal proportional to the AC input current to the rectifier 1. The output of the comparator 21 is applied to a current control circuit 10 to produce an instruction pulse that controls the lagging angle of the thyristors of the rectifier 1. The phase of the instruction pulse is shifted by a phase shifter 11. The output of the position detector 5 is applied to the gate electrodes of respective thyristors of the inverter 3 through a phase shifter 12.

Since the operation of the control system shown in FIG. 1 is well known in the art it will not described here. The speed range to which the invention is applicable is a range in which the load frequency is close to the source frequency. The control system shown in FIG. 1 generally processes various signals in terms of analogue quantities to apply gate or ignition pulses to respective thyristors at suitable times. The DC output of the rectifier 1 or the DC input to the inverter 3 comprises a DC component superimposed by an AC component caused by the ignition phase and the overlap angle. Although the DC reactor 2 absorbs such AC component, it is constructed small so as not to affect the performance of the frequency converter. For this reason, the current flowing through the AC side contains certain amount of the AC component. FIGS. 2a, 2b and 2c show voltage waveforms of respective thyristor converters where the load frequency is close to the source frequency wherein the overlap angle is neglected. In FIGS. 2a and 2b the DC voltage of the rectifier 1 and the inverter 3 are represented by $V_{dc1}$ and $V_{dc2}$ respectively. Where the commutation time of the rectifier is close to that of the inverter, the difference between respective ripple voltages, or the ripple voltage applied across the DC reactor 2 is large whereas where the commutation times of the rectifier and inverter differ substantially, the ripples voltage decreases as shown by FIG. 2c. For this reason, the AC side current contains a ripple whose amount varies depending upon the commutation angle. This phenomenon is equivalent to certain type of external disturbance applied to the control system. Considering a continuous control system, the current control system thereof can be diagrammatically shown by a block diagram shown in FIG. 3.

Figure 3:
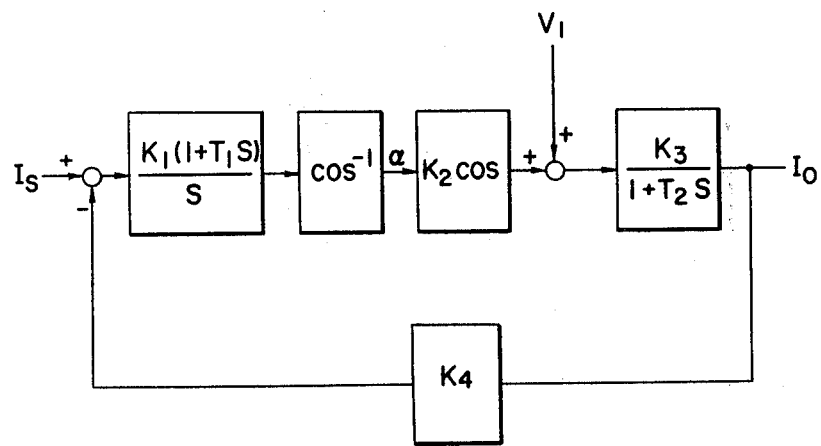
FIG. 3 is a block diagram showing a current control system utilized in the system shown in FIG. 1.

In FIG. 3, $I_s$ represents a current instruction, $K_1$, $K_2$, $K_3$ and $K_4$ constants, $T_1$ the time constant of the control system, $\alpha$ the control phase angle, $T_2$ the time constant of the controlled object, $V_1$ the external disturbance causing DC ripple voltage, S the operator of $L_a$ place transformation and $I_s$ the load current. Let us now consider an external disturbance $V_1$ having a fundamental frequency 6 times of the source frequency $f_s$. From FIGS. 2a–2c it can be noted that the level of the external disturbance $V_1$ varies cyclically at a frequency of $6|f_s-f_m|$ where $f_m$ represents the load frequency. When it is assumed that commutation is effect each time the external disturbance reaches a negative maximum value, the control lag angle $\alpha$ is also caused to vary by the external disturbance whereby as the external disturbance increases, the ignition pulses are supplied to respective thyristors with a smaller control lag angle $\alpha$, thus increasing the average current. Variation in the average current is greatly influenced by the inductance of DC reactor 2 and the response time of the current control system. Thus, the average current fluctuates at a frequency of $6|f_s-f_m|$ described above thereby resulting in a current beat and speed variation.

To overcome this difficulty, it has been the practice to increase the capacity of the DC reactor 2 or to limit the gain of the current control system but such solution is not only uneconomical but also fails to fulfill performance requirement.

Figure 4:
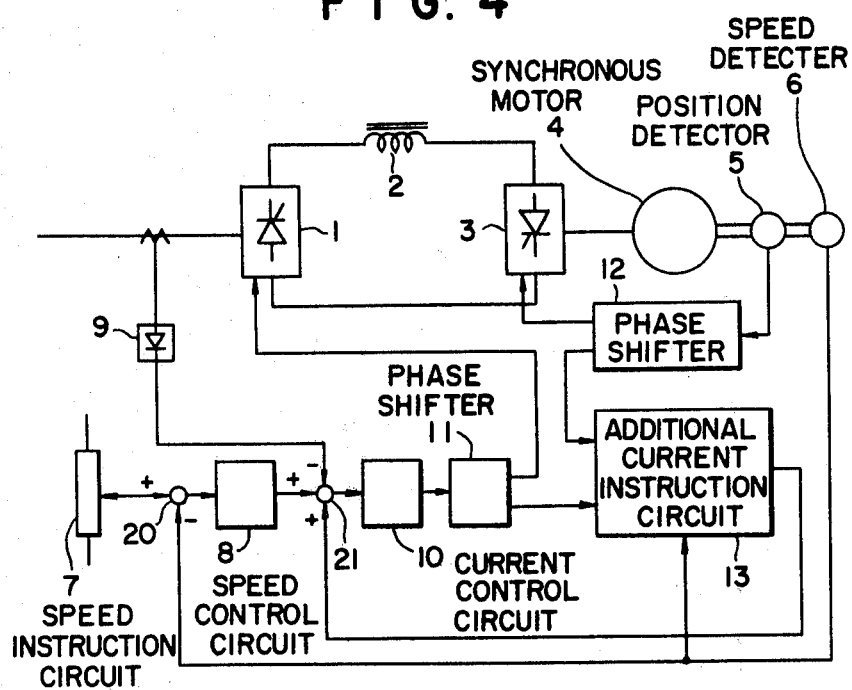
FIG. 4 is a connection diagram showing a motor control system embodying the invention.

A preferred embodiment of the control system of this invention shown in FIG. 4 is similar to that shown in FIG. 1 except that, for the purpose of suppressing the current beat, an additional current instruction circuit 13 is added for the purpose of applying an additional current instruction to the current instruction signal produced by the current control system shown in FIG. 1. The additional current instruction circuit 13 is supplied with ignition pulses for the thrystors of the rectifier and inverter and the speed signal to form the additional current instruction signal which is fed back to comparator 21.

FIG. 5 shows the detail of one example of the additional current instruction circuit 13. As shown, it comprises a flip-flop circuit FF. The output of the phase shifter 11 is applied to the set terminal S of the flip-flop circuit and the output of the phase shifter 12 is applied to the reset terminal R so that the flip-flop circuit produces an output "1" during an interval between the rectifier commutation timing and the next inverter commutation timing. The 0 output of the flip-flop circuit is applied to an operational amplifier 0A1 which comprises a low pass filter and a mean value circuit and the output of the operational amplifier 0A1 is supplied to an operation amplifier 0A2 which acts as a bias circuit to produce a binary zero output when the inverter commutation timing is at about the center of the rectifier commutation period as shown by dotted lines in FIGS. 2a–2c. The output of the operation amplifier 0A2 is supplied to an operational amplifier 0A5 acting as a bias circuit through absolute value amplifiers 0A3 and 0A4 to obtain an addition current instruction.

The output of the speed detector 6 is applied to cascade connected absolute value amplifiers 0A6 and 0A7 and the output of the amplifier 0A7 is applied to amplifiers 0A8, 0A9 and 0A10 which define a speed range in which the additional current instruction is given. Amplifier 0A8 determines the upper limit of the speed whereas amplifier 0A9 the lower limit so that speed signals intermediate of these upper and lower limits are applied to the amplifier 0A10. Usually, the amplifier 0A10 produces a negative output but a zero output in the aforementioned speed range. In response to the output of the amplifier 0A10, a switching element FET on-off controls the current instruction produced by the operational amplifier 0A5. In FIG. 5, $V_a$, $V_b$, $V_c$ and $V_d$ show bias voltage for respective operational amplifiers.

Figure 6:
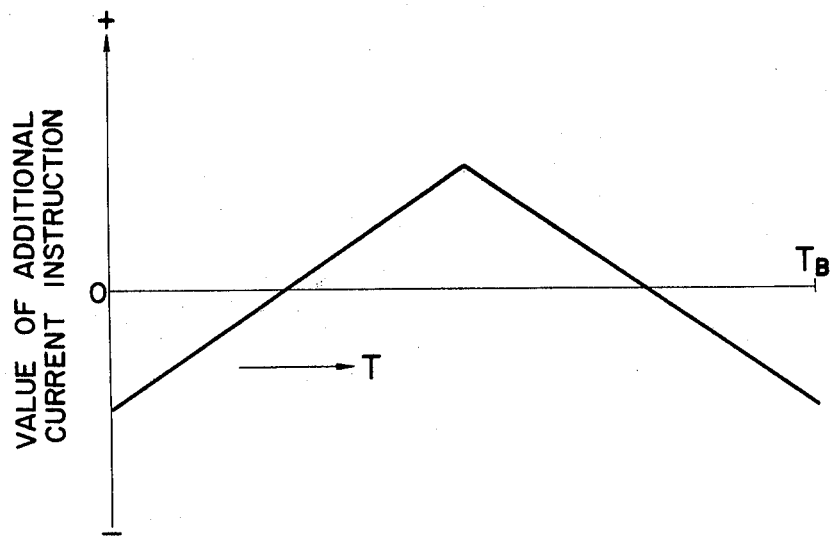
FIG. 6 is a graph useful to explain the operation of the addition current instruction circuit shown in FIG. 5.

With the addition current instruction circuit 13 described above, the output thereof varies according to a triangular wave between the inverter commutation instruction and the source side commutation instruction as shown in FIG. 6 in which $T_B$ represents the beat period above mentioned. Denoting the rectifier commutation period by $T_S$ and the difference between the rectifier commutation timing and the inverter commutation timing by T, the peak of the addition current instruction appears when $T=T_s/2$. As shown by FIG. 2c, the effect of the external disturbance is large when T is zero or approaches $T_s$. As above described, since the mean ignition angle is larger than the actual ignition angle $\alpha$ the mean current flowing through the thyristors tends to increase. However, according to this invention, the addition current generated by the addition current instruction circuit is negative near $T=0$ and $T=T_s$, the effect of the external disturbance can be minimized. It is necessary to increase the maximum value of the additional current instruction in reverse proportion to the inductance of the DC reactor 2 but in proportion to the response speed of the current control system. Since the maximum value of the effect of the external disturbance does not vary with the beat frequency $6|f_s-f_m|$, because this frequency is sufficiently smaller than the rectifier or inverter commutation frequency and it is not necessary to vary the maximum value of the additional current instruction with the value of the external disturbance. The embodiment described above operates correctly even when the load frequency exceeds the source frequency so that the inverter commutation is performed twice during the rectifier commutation period $T_s$.

Although the additional current instruction circuit were constructed to calculate analogue quantities to produce a triangular wave, the difference T may be counted digitally and the count may be applied to a ROM storing any desired waveform so as to produce an accurate additional current instruction.

According to the addition current instruction circuit it is possible to eliminate the beat caused by the time difference between the rectifier commutation and the inverter commutation thus enabliing stable operation of the motor over the entire speed range. Moreover, as it is not necessary to decrease the response speed of the current control system it is not necessary to use high quality frequency converter to drive the motor. Thus it is not necessary to increase the capacity of the DC reactor.

In the foregoing description, the frequency converter comprising a rectifier and an inverter has been shown diagrammatically because many types of rectifiers and inverters are well known. It should be understood that the invention is also applicable to such another type frequency converter, for example a cycloconverter including a plurality branch circuits each containing thyristors and mutually coupled reactors.

I claim:

1. In a system of controlling an alternating current motor fed from a source of alternating current via a rectifier and an inverter, each comprising semiconductor switching elements, wherein the speed of the motor is controlled by a control current produced by a current control system including a speed control circuit responsive to a reference speed signal and an actual speed signal of said motor, and a current control circuit responsive to the output of said speed control circuit for producing a first pulse signal supplied to the semiconductor switching elements of said rectifier and wherein the semiconductor elements of said inverter is controlled by a second pulse corresponding to an angular position of the rotor of said motor, the improvement which comprises an additional current instruction circuit responsive to said first and second pulse signals and a signal representing said actual speed, and means for applying the output of said additional current instruction circuit to said current control circuit.

2. The control system according to claim 1 wherein said last mentioned means is interposed between said speed control circuit and said current control circuit for adding together a signal representing alternating current input to said rectifier, the output of said speed control circuit and the output of said addition current instruction circuit.

* * * * *